A. E. RICHARDSON.
IRRIGATOR AND SPRINKLER.
APPLICATION FILED OCT. 18, 1912.
1,077,431.
Patented Nov. 4, 1913.
2 SHEETS—SHEET 1.
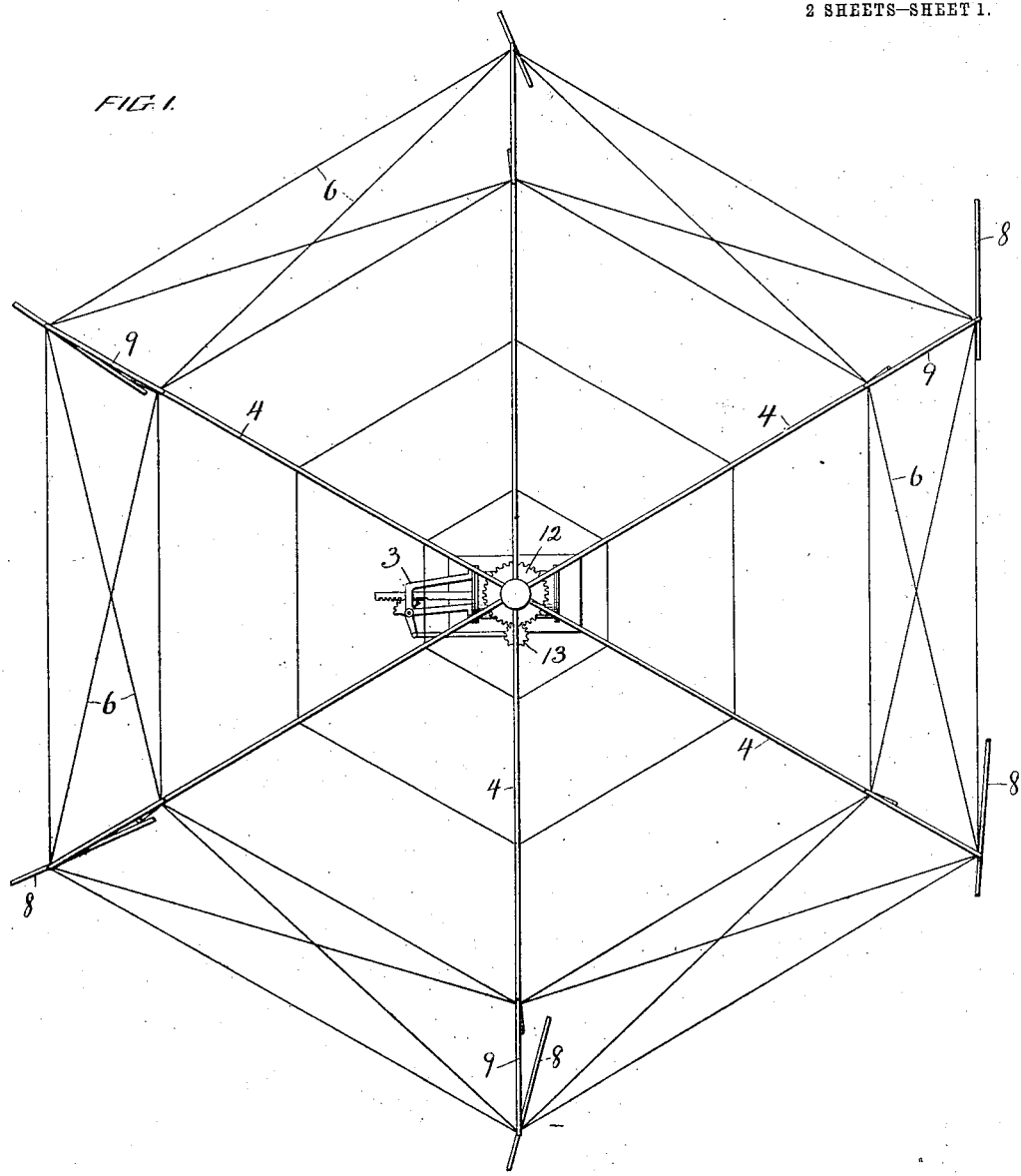
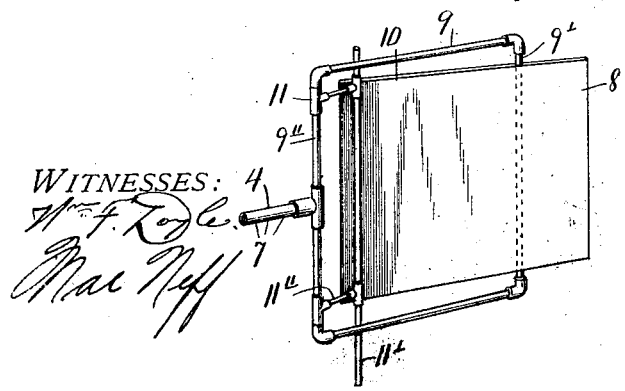

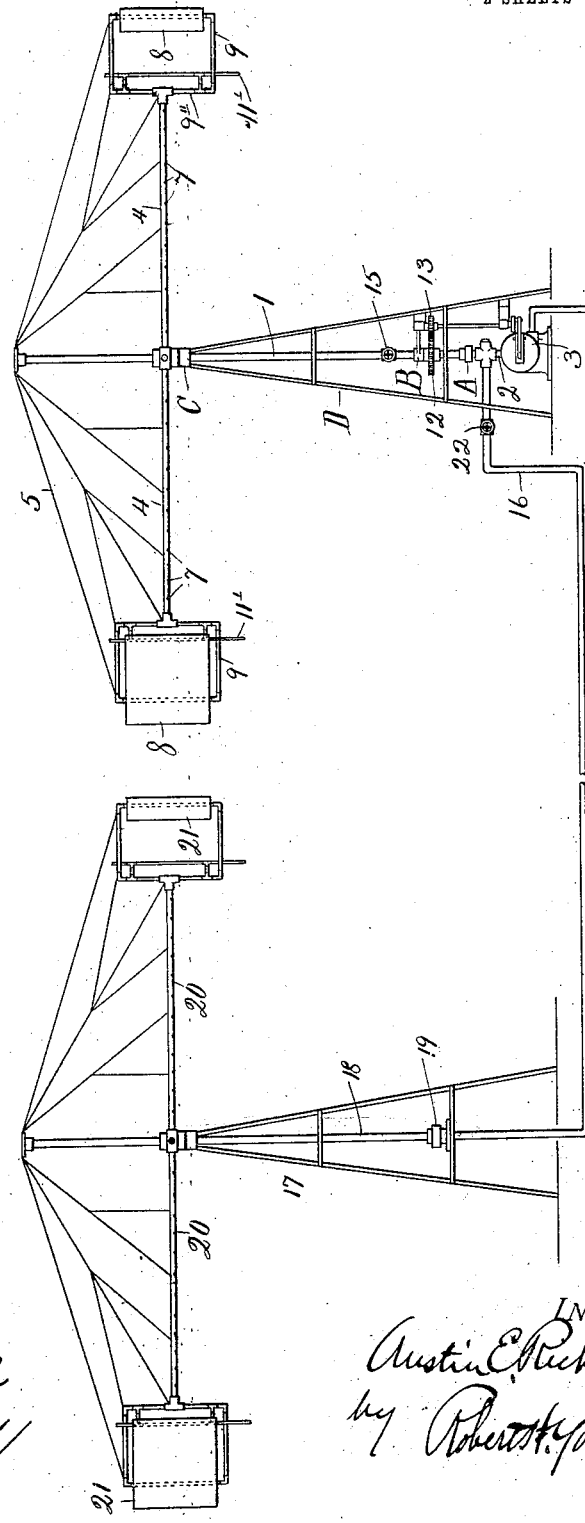

UNITED STATES PATENT OFFICE.

AUSTIN E. RICHARDSON, OF WEST PALM BEACH, FLORIDA.

IRRIGATOR AND SPRINKLER.

1,077,431.  Specification of Letters Patent.  Patented Nov. 4, 1913.

Application filed October 18, 1912. Serial No. 726,452.

*To all whom it may concern:*

Be it known that I, AUSTIN E. RICHARDSON, a citizen of the United States, residing at West Palm Beach, county of Palm Beach, State of Florida, have invented new and useful Improvements in Irrigators and Sprinklers, of which the following is a specification.

My invention relates to wind-driven irrigators and sprinklers.

The object of my invention is to produce a wind motor for pumping water from a well or cistern and for distributing and sprinkling the water to irrigate the land.
Another object of my invention is to produce a wind motor provided with radial arms on a horizontal plane connected with the source of water supply and provided with a plurality of perforations for sprinkling the water as the arms rotate.

A further object thereof is to produce a wind motor provided with a plurality of pivoted sails or vanes adapted to operate same, and a still further object is to provide a more simple, cheap and efficient wind motor and irrigator than has heretofore been produced.

To these ends my invention includes the combination and arrangement of component parts to be hereinafter described and more particularly pointed out in the claims.

In the drawings in which like reference characters indicate similar parts, Figure 1 is a plan view of my invention, Fig. 2 is a side elevation of my wind motor and water sprinkler, partly in cross section, and Fig. 3 is a perspective view of one of the sails or vanes of my motor.

My invention includes, generally, a vertical hollow shaft carried in suitable bearings coupled at its lower end with a water supply pipe, hollow horizontally disposed radial arms coupled with said vertical shaft adjacent to its upper end and provided with a plurality of perforations communicating with the bore therein, a pivoted wind sail on the end of each of said arms, stops for locking said sails in operative position, a gear wheel carried on the vertical shaft and meshed with a driven wheel for operating a pump mechanism for forcing water through said shaft and radial arms, a plurality of wind operated sprinklers coupled with the pump mechanism, suitable cocks for controlling the distribution of the water from the pump, all fully set forth and described hereinafter.

Referring now to the drawings, 1 indicates a vertical hollow shaft carried in suitable bearings, A, B, and C and supported by the braces D. Said shaft at its base communicates with the water supply pipe 2 from the pump mechanism 3. Said pump is operated by the rotation of the shaft 1 on its bearings, as hereinafter described, but as the particular construction of the pump forms no part of my invention, it will not be particularly described.

Below the top of the shaft 1, and communicating with the bore therein, a plurality of radial horizontally disposed arms 4 are secured at one end, and held in horizontal position by the guy wires 5 and in spaced relation by the wires 6. Each of said arms 4 is provided with a central longitudinal bore and with a plurality of spaced ports 7 through which the water forced thereinto is sprinkled upon the ground.

The shaft 1 is forced to rotate by the sails or vanes 8 carried upon the outer free ends of the arms 4, which I shall now proceed to describe. On the outer end of each of said arms 4 is rigidly secured the rectangular vertically disposed frame 9, upon the outer vertical member 9′ of which is pivotally mounted the sail or vane 8, said vane being pivoted eccentrically. Said vane is adapted to normally swing freely with the direction of the wind, except when interrupted by the stop 11 pivotally mounted upon the inner vertical member 9″ of the frame 9. Said stop as shown, comprises a vertical rod 11′ carried upon the pivoted arms 11″ of greater length than the vertical members 9′ and 9″, and adapted to be interposed between the longer end of the vane 10 and the horizontal members of the frame 9 to interrupt the vane 8 when driven by the wind and force the arms 4 and the shaft 1 to rotate. It will be appreciated that as the arms rotate and the vanes successively pass into neutral or adverse relation to the wind, the vanes swing out of resisting position, and are successively returned to resisting position and contacting relation with the stops 11. It will be further appreciated that the stops 11 may be swung out of the path of the vanes 8 and the rotation of the arms and shaft thus stopped.

Adjacent to the lower end of the shaft 1, a gear wheel 12 is secured which meshes with the gear wheel 13 for driving the pump mechanism 3 by which water from any suitable supply may be forced through the shaft 1 and the arms 4 and sprinkled through the ports 7 therein.

My invention further contemplates the employment of auxiliary wind operated sprinklers supplied by the pump mechanism thus described, and rotated by a plurality of vanes similar to those just described. For the purpose of directing the water to such sprinklers, the shaft 1 is provided with a cock 15 by which the water may be cut off, and forced from the pump 3 to flow into the auxiliary pipe 16 to the sprinklers 17, located at a desired distance from the pump. The sprinklers 17, comprise the hollow shaft 18 rotatably mounted in a base 19 and communicating with the supply pipe 16. Adjacent to the top of the shaft 18 hollow radial arms 20 are secured communicating with the bore of the shaft, said arms being provided with a plurality of ports for sprinkling the water forced thereinto. Upon the outer ends of said arms, are carried wind vanes 21 similar to those carried on the arms 4 of the motor shaft 1 by which the sprinkler is rotated to distribute the water therefrom.

The cock 22 in the pipe 16 will, of course, be closed when the auxiliary sprinklers are not in use.

The construction and operation of my irrigating sprinkler will be readily understood from the foregoing description and by reference to the accompanying drawings, and it will be appreciated that the parts and combinations thereof may be varied within a wide range without departing from the spirit and scope of the invention.

Having thus described my invention, what I claim as new, and desire to be secured by Letters Patent, is—

1. An irrigator and sprinkler, comprising a rotatable upright hollow shaft, a water supply pipe coupled therewith, radial hollow arms coupled with said shaft provided with a plurality of sprinkling ports, wind vanes carried on said arms to rotate the shaft and arms, a pump for forcing water through said shaft and arms, and connecting means between said rotatable shaft and pump for operating the pump.

2. An irrigator and sprinkler, comprising a rotatable upright hollow shaft, a water supply pipe coupled therewith, radial hollow arms coupled at one end to said shaft and provided with a plurality of sprinkling ports, rectangular frames carried on the outer ends of said arms, wind vanes eccentrically pivoted on the outer members of said frames, shiftable stops pivotally carried on the inner members thereof adapted to be adjusted to intercept or escape said vanes.

AUSTIN E. RICHARDSON.

Witnesses:
Geo. G. Currie,
Etta L. Keen.

Copies of this patent may be obtained for five cents each, by addressing the "Commissioner of Patents, Washington, D. C."